(12) United States Patent
Montejo

(10) Patent No.: US 11,926,495 B1
(45) Date of Patent: Mar. 12, 2024

(54) TRAILER WITH INCORPORATED CONVEYOR ASSEMBLY

(71) Applicant: Fidel Montejo, Miami, FL (US)

(72) Inventor: Fidel Montejo, Miami, FL (US)

(\*) Notice: Subject to any disclaimer, the term of this patent is extended or adjusted under 35 U.S.C. 154(b) by 51 days.

(21) Appl. No.: 17/834,552

(22) Filed: Jun. 7, 2022

(51) Int. Cl.
*B65G 67/20* (2006.01)
*B60P 1/38* (2006.01)

(52) U.S. Cl.
CPC ............... *B65G 67/20* (2013.01); *B60P 1/38* (2013.01)

(58) Field of Classification Search
CPC ................ B60P 1/38; B60P 1/36; B60P 1/365
See application file for complete search history.

(56) References Cited

U.S. PATENT DOCUMENTS

| | | | | |
|---|---|---|---|---|
| 5,902,090 A | * | 5/1999 | Young | B60P 1/38 198/570 |
| 10,322,660 B1 | * | 6/2019 | Dermeche | B60P 1/38 |
| 2008/0038101 A1 | * | 2/2008 | Klatt | B60R 5/04 414/345 |
| 2013/0343848 A1 | * | 12/2013 | Wangen | B60P 1/38 414/528 |

\* cited by examiner

*Primary Examiner* — Mark C Hageman
(74) *Attorney, Agent, or Firm* — Albert Bordas P.A.

(57) ABSTRACT

A trailer with an incorporated conveyor assembly, having at least one conveyor belt assembly with a conveyor belt and a frame. A trailer base assembly has a trailer floor, whereby the frame is mounted onto the trailer base assembly. Further having a trailer frame assembly. The at least one conveyor belt assembly further has a motorized pulley connected to a motor that is mounted onto the frame. The at least one conveyor belt assembly further has rollers and a switch. The trailer base assembly has first and second trailer floor ends. The trailer base assembly further has at least first and second trailer floor edges, and at least one exterior conveyor belt cover. The conveyor belt is positioned between the first and second trailer floor edges.

8 Claims, 3 Drawing Sheets

TRAILER WITH INCORPORATED CONVEYOR ASSEMBLY

BACKGROUND OF THE INVENTION

Field of the Invention

The present invention relates to tractor-trailers, and more particularly, to trailers with incorporated conveyor assemblies.

Description of the Related Art

Applicant is not aware of any trailers with incorporated conveyor assemblies having the novel features of the present invention.

SUMMARY OF THE INVENTION

The present invention is a trailer with incorporated conveyor assembly, comprising at least one conveyor belt assembly comprising a conveyor belt and a frame. A trailer base assembly comprises a trailer floor, whereby the frame is mounted onto the trailer base assembly. Further comprising a trailer frame assembly.

The at least one conveyor belt assembly further comprises a motorized pulley connected to a motor that is mounted onto the frame. The at least one conveyor belt assembly further comprises rollers and a switch. The trailer base assembly comprises first and second trailer floor ends. The trailer base assembly further comprises at least first and second trailer floor edges, and at least one exterior conveyor belt cover. The conveyor belt is positioned between the first and second trailer floor edges. The trailer base assembly comprises a base exterior side, and the exterior conveyor belt cover is fixed to the base exterior side covering an exterior side of the conveyor belt. The conveyor belt runs longitudinally within the trailer base assembly and is positioned between the first and second trailer floor edges.

Further comprising a motion detector system that is mounted on the trailer frame assembly. The trailer frame assembly comprises first and second lateral frames, a top frame, and a bottom frame. The motion detector system comprises at least one laser, at least one detector, and sensing electronics. The at least one laser and the at least one detector are mounted opposite to each other, whereby the laser emits at least one laser beam received by the detector. The conveyor belt moves in both directions. The motion detector system is connected to the switch. The sensing electronics are connected to the detector and to the switch. The sensing electronics has a wireless connection with the switch. The laser beam is interrupted it causes the sensing electronics to emit a signal to turn off the switch and stop the conveyor belt.

In another embodiment, a trailer with incorporated conveyor assembly comprises at least one conveyor belt assembly comprising a conveyor belt, a frame, and first and second motorized pulleys connected to respective first and second motors that are mounted onto the frame. The at least one conveyor belt assembly further comprises rollers and a switch. A trailer base assembly comprises a trailer floor, whereby the frame is mounted onto the trailer base assembly; and further comprising a trailer frame assembly.

The trailer base assembly comprises first and second trailer floor ends. The trailer base assembly further comprises at least first and second trailer floor edges. The conveyor belt is positioned between the first and second trailer floor edges. The trailer base assembly comprises a base exterior side, and the exterior conveyor belt cover is fixed to the base exterior side covering an exterior side of the conveyor belt.

The conveyor belt runs longitudinally within the trailer base assembly and is positioned between the first and second trailer floor edges, further comprising a motion detector system that is mounted on the trailer frame assembly. The trailer frame assembly comprises first and second lateral frames, a top frame, and a bottom frame. The motion detector system comprises at least one laser, at least one detector, and sensing electronics, wherein the at least one laser and the at least one detector are mounted opposite to each other, whereby the laser emits at least one laser beam received by the detector.

The conveyor belt moves in both directions. The motion detector system is connected to the switch. The sensing electronics are connected to the detector and to the switch. The sensing electronics has a wireless connection with the switch. When the laser beam is interrupted, it causes the sensing electronics to emit a signal to turn off the switch and stop the conveyor belt.

It is therefore one of the main objects of the present invention to provide a trailer with an incorporated conveyor assembly.

It is another object of this invention to provide a trailer with an incorporated conveyor assembly to load and unload pallets and/or packages or matter thereon.

It is another object of this invention to provide a trailer with an incorporated conveyor assembly, whereby a load may be moved into a trailer without the use of a pallet jack.

It is another object of this invention to provide a trailer with an incorporated conveyor assembly, which allows loading and unloading to be easier and faster while avoiding accidents.

It is another object of this invention to provide a trailer with an incorporated conveyor assembly, which is of a durable and reliable construction.

It is yet another object of this invention to provide such an assembly that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE INVENTION

Figure 1:
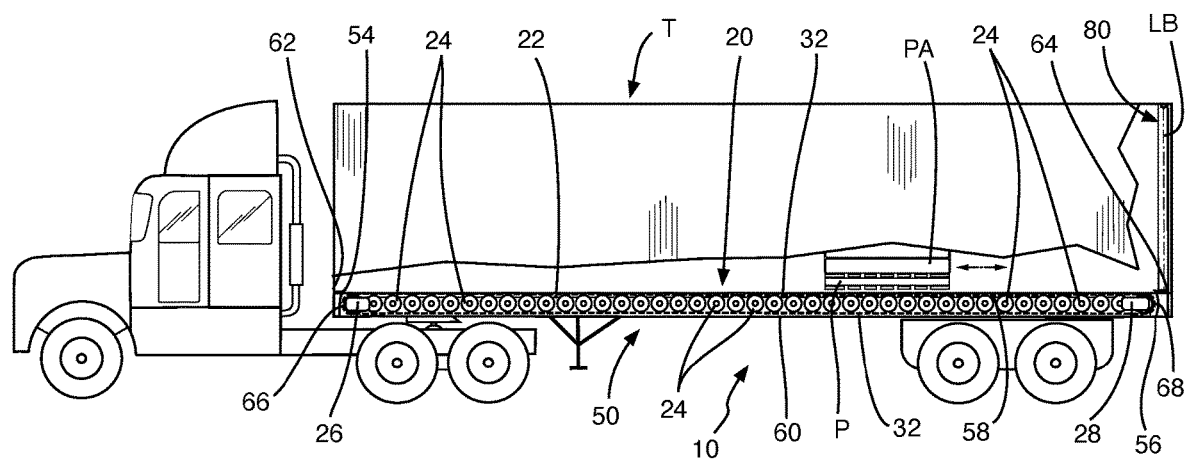
FIG. 1 is a side elevational view of a tractor-trailer with an incorporated conveyor assembly, wherein a trailer lateral wall has been partially cross-sectioned to show the present invention.

Referring now to the drawings, the present invention is a trailer with an incorporated conveyor assembly and is generally referred to with numeral 10. It can be observed that it basically includes at least one conveyor belt assembly 20, trailer base assembly 50, trailer frame assembly 80, and motion detector system 100.

Figure 1A:
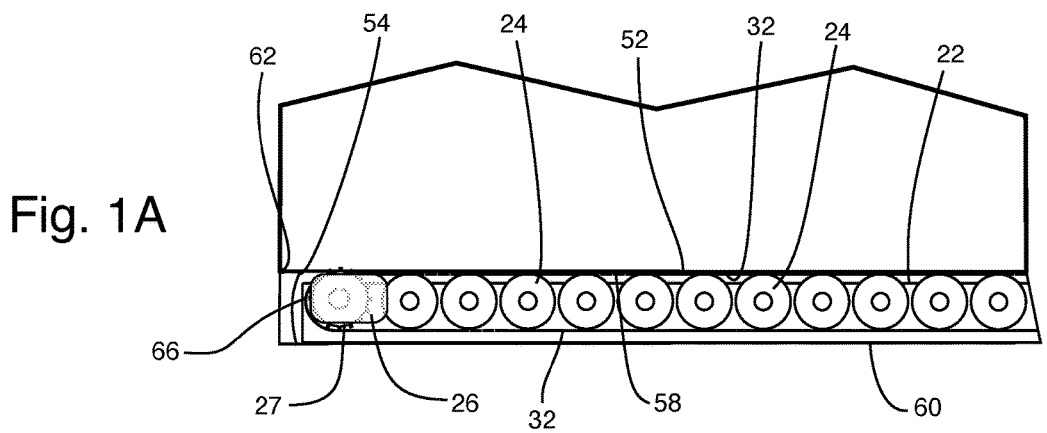
FIG. 1A is an enlarged side elevational view of a motorized pulley connected to a motor as seen in FIG. 1.
Figure 2:
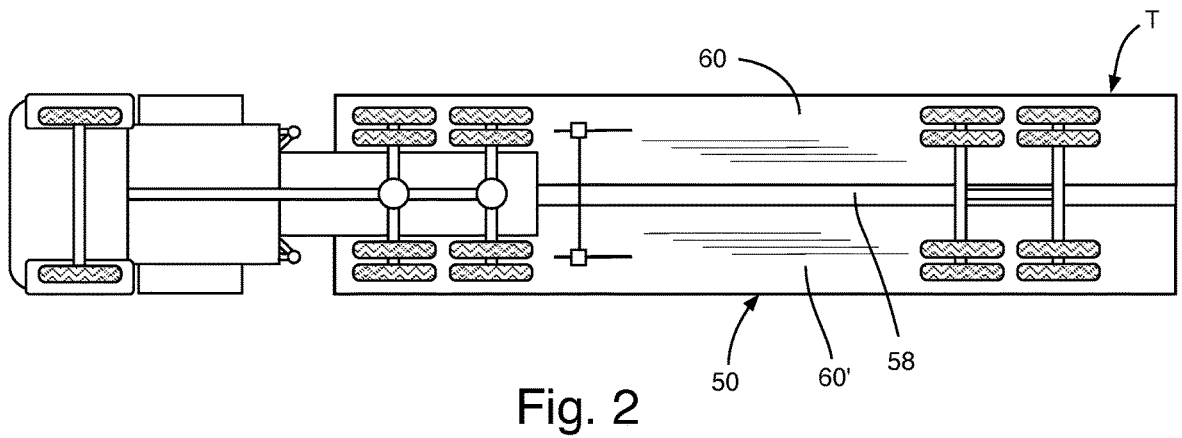
FIG. 2 is a bottom plan view of the tractor-trailer showing exterior conveyor belt covers.

As seen in FIGS. 1, 1A and 2, at least one conveyor belt assembly 20 is installed onto trailer base assembly 50 of trailer T. The at least one conveyor belt assembly 20 comprises conveyor belt 22, rollers 24, first and second motors 26 and 28, and switch 30, seen in FIG. 4. Trailer base assembly 50 comprises trailer floor 52, seen in FIG. 4, base exterior side 58, and first and second ends 62 and 64. Trailer base assembly 50 further comprises first and second trailer floor edges 54 and 56, and exterior conveyor belt cover 60. First trailer floor edge 54 is adjacent to first end 62, and second trailer floor edge 56 is adjacent to second end 64. Conveyor belt 22 is positioned between first and second trailer floor edges 54 and 56. Exterior conveyor belt cover 60 is fixed to base exterior side 58, covering an exterior side of conveyor belt 22. In a preferred embodiment, trailer base assembly 50 comprises a first exterior conveyor belt cover 60 and a second exterior conveyor belt cover 60'. Conveyor belt 22 runs longitudinally within trailer base assembly 50 and is positioned between first and second trailer floor edges 54 and 56.

Figure 3A:
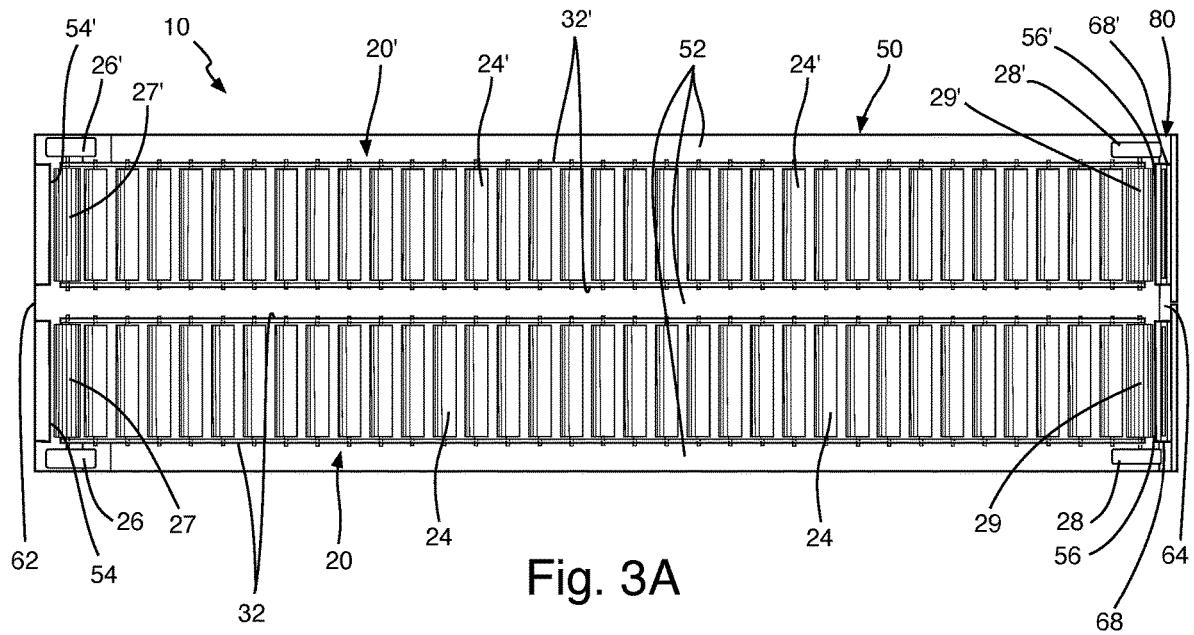
FIG. 3A is a top plan view seen from an interior of the trailer, showing respective rollers of the first and second conveyor belt assemblies.
Figure 3B:
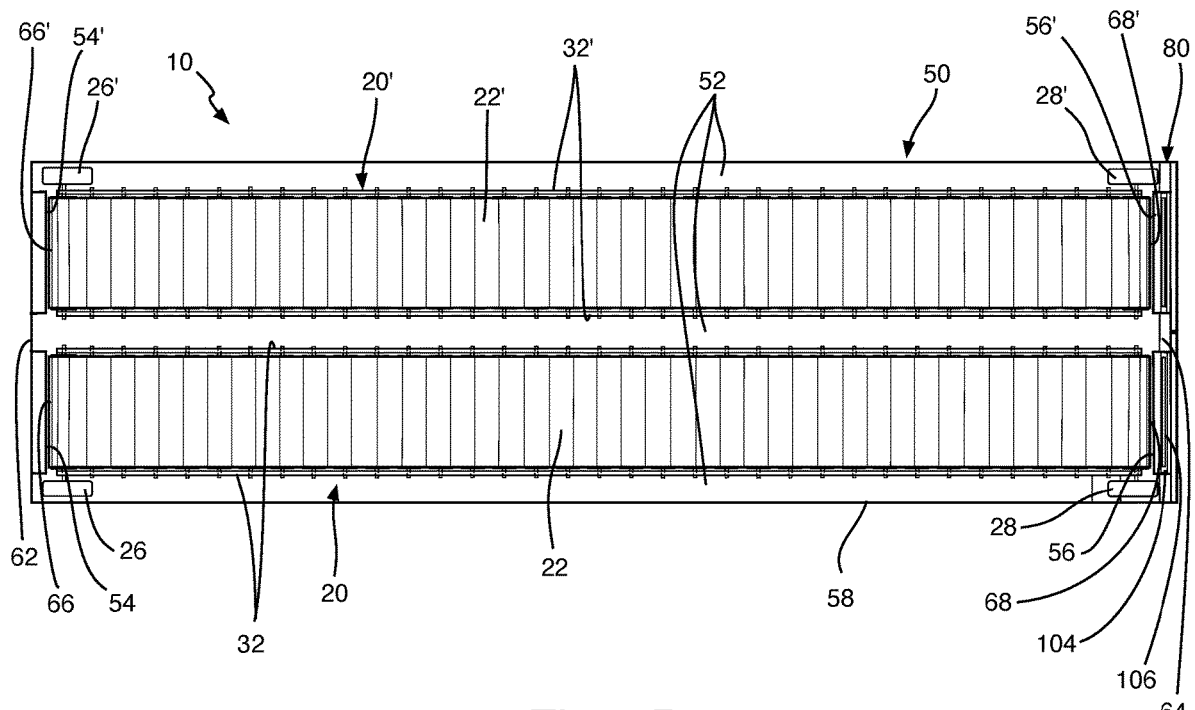
FIG. 3B is a top plan view of the interior of the trailer, showing the first and second conveyor belt assemblies.
Figure 4:
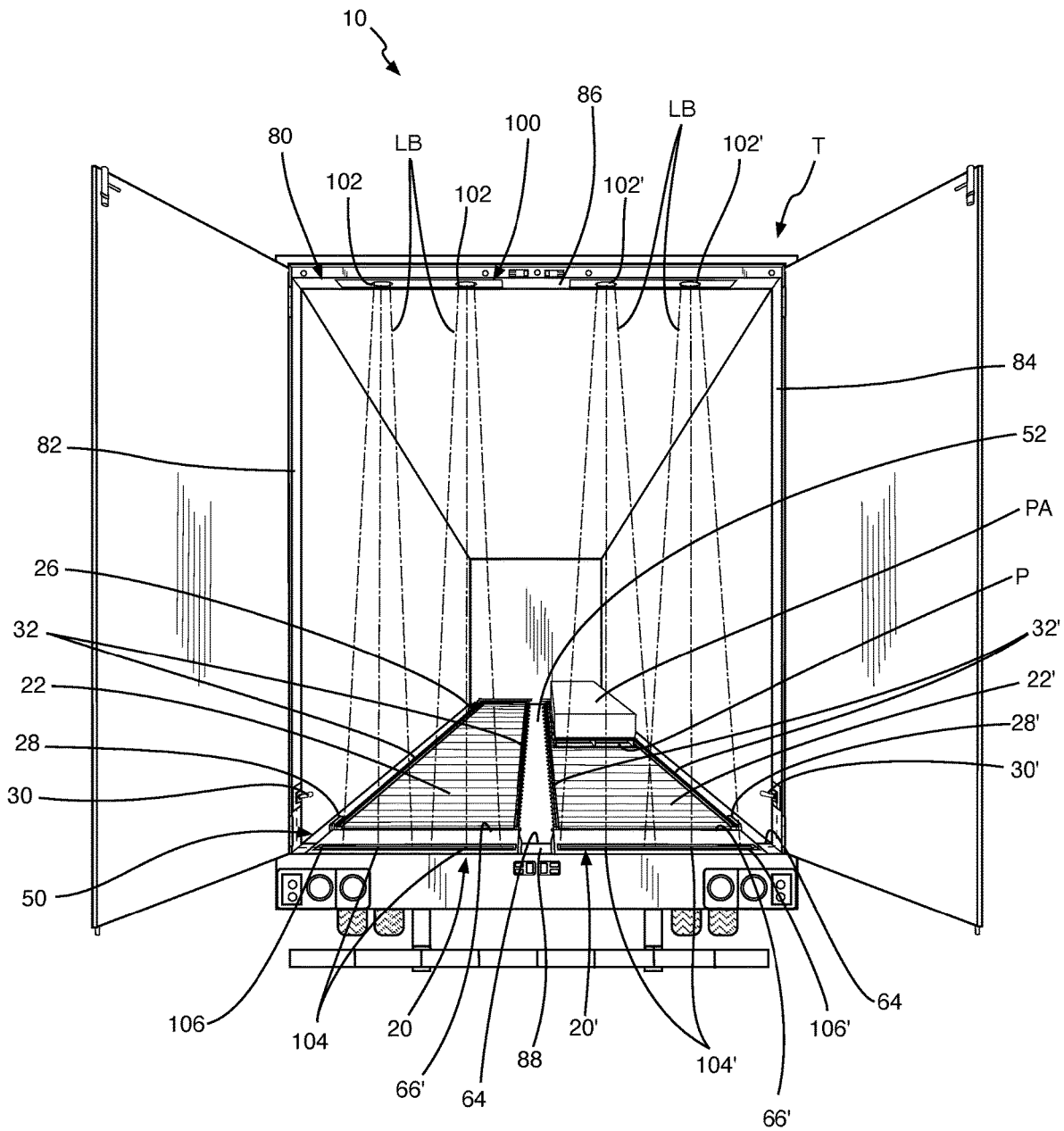
FIG. 4 is a perspective view looking into the trailer and showing the present invention.

As seen in FIGS. 3A and 3B, in a preferred embodiment, present invention 10 comprises first conveyor belt assembly 20 and second conveyor belt assembly 20' comprising first conveyor belt 22 and second conveyor belt 22' respectively for loading and unloading pallets P with respective loads and/or packages PA, as seen in FIG. 4. In a preferred embodiment, first conveyor belt assembly 20 and second conveyor belt assembly 20' are structurally and functionally the same.

Second conveyor belt assembly 20' comprises conveyor belt 22', rollers 24', first and second motors 26' and 28', and switch 30', seen in FIG. 4. Conveyor belt 22' runs longitudinally within trailer base assembly 50 and is positioned between first and second trailer floor edges 54' and 56'.

Motorized pulley 27, connected to motor 26, is mounted onto frame 32 and is positioned at conveyor end 66. Rollers 24 are mounted onto frame 32. And motorized pulley 29, connected to motor 28, is mounted onto frame 32 at conveyor end 68. In a preferred embodiment, motorized pulleys 27 and 29 are synchronized.

Similarly, motorized pulley 27', connected to motor 26', is mounted onto frame 32' and is positioned at conveyor end 66'. Rollers 24' are mounted onto frame 32'. And motorized pulley 29', connected to motor 28', is mounted onto frame 32' at conveyor end 68'. In a preferred embodiment, motorized pulleys 27' and 29' are synchronized.

Motorized pulleys 27, 27', 29, and 29' can be for example drive pulleys, head pulleys, and/or any motorized pulleys having motors with sufficient power to cause conveyor belts 22 and 22' to independently move with respective rollers 24 and 24' with weight from pallets P, with or without packages PA and/or matter thereon, seen in FIG. 4.

As seen in FIG. 4, interior sides of conveyor belts 22 and 22' receive pallets P with respective loads or packages PA. In a preferred embodiment, conveyor belts 22 and 22' are flush, or approximately flush, with trailer floor 52, whereby frames 32 and 32' are mounted onto trailer base assembly 50. It is noted that frames 32 and 32' are sufficiently strong and sturdy to safely sustain the weight of pallets P, with or without packages PA and/or matter thereon. Conveyor belts 22 and 22' move pallets P and/or packages PA inside trailer T, whereby a plurality of rollers 24 and 24' are mounted on frames 32 and 32' respectively to support and move pallets P with, or without packages PA and/or matter thereon.

Conveyor belt assemblies 20 and 20' are independent from each other and operate independently from each other, whereby they comprise respective switches 30 and 30'. Switches 30 and 30' are connected to respective motorized pulleys 27, 27', 29, and 29', seen in FIG. 3A. In a preferred embodiment, switches 30 and 30' are independent from each other and are operated by a user to turn conveyor belts 22 and 22' "on" and "off", whereby conveyor belts 22 and 22' move in both directions to load and unload pallets P with, or without packages PA and/or matter thereon.

First switch 30 is operated for loading and unloading pallets P with, or without packages PA and/or matter on conveyor belt 22 at a first trailer door side, and second switch 30' is operated for loading and unloading pallets P with, or without packages PA and/or matter thereon on conveyor belt 22' at a second trailer door side. By operating switches 30 and 30', first conveyor belt 22 and second conveyor belt 22' respectively move pallets P with, or without packages PA and/or matter thereon a desired distance, whereby a user may load/unload pallets P, with or without packages PA and/or matter thereon, one by one, without entering trailer T and/or using a pallet jack or other apparatus to move pallets P, with or without packages PA and/or matter.

First conveyor belt 22 and second conveyor belt 22' comprise an anti-slip surface, whereby pallets P, with or without packages PA and/or matter, are secured on respective conveyor belts 22 and 22' without sliding or shifting when the tractor-trailer brakes or accelerates.

Motion detector system 100 is mounted on trailer frame assembly 80. Trailer frame assembly 80 comprises first and second lateral frames 82 and 84, top frame 86, and bottom frame 88. Motion detector system 100 comprises at least one laser 102, at least one detector 104, and sensing electronics 106. At least one laser 102 and at least one detector 104 are mounted opposite to each other, whereby laser 102 emits at least one laser beam LB received by detector 104. In a preferred embodiment, at least one laser 102 is mounted on top frame 86 and at least one detector 104 is mounted onto bottom frame 88. Sensing electronics 106 are connected to detector 104 and to switch 30. In a preferred embodiment, sensing electronics 106 has a wireless connection with switch 30. When detector 104 does not sense the laser beam, sensing electronics are activated and switch 30 is turned off. Trailer frame assembly 80 with motion detector system 100 is positioned adjacent to the trailer doors, whereby motion detector system 100 detects if any pallets P with a respective load or packages PA approaches the door, preventing it from falling.

In a preferred embodiment, motion detector system 100 comprises first and second lasers 102 and 102', first and second detectors 104 and 104', and respective sensing electronics 106 and 106'. Motion detector system 100 connects to switch 30 and switch 30'. When switch 30 is turned on, respective laser 102 and detector 104 are activated and when switch 30 is turned off, laser 102 and detector 104 are deactivated. In the same way, when switch 30' is turned on, respective laser 102' and detector 104' are activated and if switch 30' is turned off, respective lasers 102' and detectors 104' are deactivated. Laser 102 and detector 104 are positioned to detect motion from conveyor belt assembly 20, whereby sensing electronics 106 connect with first switch 30. When laser beam LB is interrupted, specifically by pallets P with the respective load or packages PA, detector 104 no longer senses laser beam LB causing sensing electronics 106 to emit a signal to turn off switch 30 and stop conveyor belt 22.

Similarly, laser 102' and detector 104' are positioned to detect motion from conveyor belt assembly 20', whereby sensing electronics 106' connect with second switch 30'. When laser beam LB is interrupted by pallets P with the respective load or packages PA, detector 104' no longer senses laser beam LB causing sensing electronics 106' to emit a signal to turn off switch 30' and stop conveyor belt 22'. In addition, motion detector system 100 may comprise an audio alarm to make sound when pallet P is approaching the doors as its being unloaded.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A trailer with incorporated conveyor assembly, comprising:
   A) a first conveyor belt assembly and a second conveyor belt assembly comprising first conveyor belt and second conveyor belt respectively for loading and unloading pallets, said first and second conveyor belt assemblies each comprises rollers, a switch, and a respective motorized pulley connected to a respective motor mounted onto a respective frame;
   B) a trailer base assembly comprising a trailer floor, trailer floor edges, first and second exterior conveyor belt covers, a base exterior side, whereby said first and second exterior conveyor belt covers are fixed to said base exterior side covering an exterior side of said first and second conveyor belts respectively, said frames are mounted onto said trailer base assembly and said first and second conveyor belts are flush with said trailer floor, said first and second conveyor belts run longitudinally within said trailer base a assembly and are positioned between said respective trailer floor edges; and
   C) a trailer frame assembly having mounted a motion detector system, comprising at least one laser, at least one detector, and sensing electronics, said at least one laser and said at least one detector are mounted opposite to each other, whereby said laser emits at least one laser beam received by said detector, said motion detector system is connected to said switches and said sensing electronics are connected to said detector and to said switches.

2. The trailer with incorporated conveyor assembly set forth in claim 1, wherein said trailer base assembly comprises first and second trailer floor ends.

3. The trailer with incorporated a conveyor assembly set forth in claim 2, wherein said first and second conveyor belts are positioned between said first and second a trailer floor ends.

4. The trailer with incorporated conveyor assembly set forth in claim 1, wherein said trailer frame assembly comprises first and second lateral frames, a top frame, and a bottom frame.

5. The trailer with incorporated conveyor assembly set forth in claim 1, wherein said first and second conveyor belt moves in both directions.

6. The trailer with incorporated conveyor assembly set forth in claim 1, wherein said sensing electronics has a wireless connection with said switch.

7. The trailer with incorporated conveyor assembly set forth in claim 1, wherein when said laser beam is interrupted it causes said sensing electronics to emit a signal to turn off said respective switch and stop said respective first and second conveyor belts.

8. A trailer with incorporated conveyor assembly, comprising:
   A) first and second conveyor belt assemblies comprising first and second conveyor belts, first and second frames, and respective motorized pulleys connected to respective first and second motors that are mounted onto said frames, said first and second conveyor belt assemblies each further comprises rollers and a switch;
   B) a trailer base assembly comprising a trailer floor, whereby said frames are mounted onto said trailer base assembly, said trailer base assembly comprises trailer floor ends, trailer floor edges, said first and second conveyor belts are positioned between said first and second trailer floor edges, said trailer base assembly comprises a base exterior side, and first and second exterior conveyor belt covers are fixed to said base exterior side covering an exterior side of said first and second conveyor belts, which run longitudinally within said trailer base assembly, a motion detector system is mounted on a trailer frame assembly, said trailer frame assembly comprises first and second lateral frames, a top frame, and a bottom frame, said motion detector system comprises at least one laser, at least one detector, and sensing electronics, wherein said at least one laser and said at least one detector are mounted opposite to each other, whereby said laser emits at least one laser beam received by said detector, said first and second conveyor belt moves in both directions, said motion detector system is connected to said switch, said sensing electronics are connected to said detector and to said switch, said sensing electronics has a wireless connection with said switch, when said laser beam is interrupted it causes said sensing electronics to emit a signal to turn off said respective switch and stop said first and second conveyor belts.

\* \* \* \* \*